US012512591B1

(12) United States Patent
Samson et al.

(10) Patent No.: US 12,512,591 B1
(45) Date of Patent: Dec. 30, 2025

(54) PARTIALLY METALIZED ANTENNA CAVITY FOR PLANAR ANTENNAS

(71) Applicant: Lockheed Martin Corporation, Bethesda, MD (US)

(72) Inventors: Timothy Wallace Samson, Lakewood, CO (US); Sean F. Indman, San Jose, CA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 326 days.

(21) Appl. No.: 18/162,758

(22) Filed: Feb. 1, 2023

Related U.S. Application Data

(60) Provisional application No. 63/305,294, filed on Feb. 1, 2022.

(51) Int. Cl.
*H01Q 9/04* (2006.01)
*H01Q 1/38* (2006.01)

(52) U.S. Cl.
CPC .................................. *H01Q 9/0407* (2013.01)

(58) Field of Classification Search
CPC .. H01Q 9/27; H01Q 1/36; H01Q 1/38; H01Q 11/10; H01Q 1/28; H01Q 11/105; H01Q 21/065; H01Q 7/00; H01Q 1/286; H01Q 1/50; H01Q 9/0457
See application file for complete search history.

(56) References Cited

U.S. PATENT DOCUMENTS

| | | | | |
|---|---|---|---|---|
| 4,658,262 | A * | 4/1987 | DuHamel | H01Q 11/10 343/895 |
| 5,212,494 | A * | 5/1993 | Hofer | H01Q 9/27 343/859 |
| 6,018,323 | A * | 1/2000 | Van Hoozen | H01Q 1/36 343/895 |
| 6,018,327 | A | 1/2000 | Nakano et al. | |
| 6,844,862 | B1 | 1/2005 | Cencich et al. | |
| 7,609,226 | B1 | 10/2009 | MacGahan et al. | |
| 7,889,151 | B1 * | 2/2011 | Brock | H01Q 9/27 343/895 |
| 10,903,556 | B2 * | 1/2021 | Lam | H01P 1/2005 |
| 11,217,881 | B1 * | 1/2022 | Cencich | H01Q 1/36 |
| 11,329,384 | B2 * | 5/2022 | Rojas | H01Q 9/0471 |
| 2001/0000604 | A1 * | 5/2001 | Qian | H01J 37/321 219/121.52 |

(Continued)

OTHER PUBLICATIONS

Antenna-Theory.com, "Sprial Antennas," http://www.antenna-theory.com/antennas/travelling/spiral.php, 7 pages, 2015.

(Continued)

*Primary Examiner* — Wei (Victor) Y Chan

(57) ABSTRACT

Provided herein are various enhancements for radio frequency antennas and antenna assemblies. In one example, an antenna assembly includes a cavity structure comprising an interior volume surrounded by a wall and having an opening at a first longitudinal end and a cap at a second longitudinal end. A conductive material disposed on a portion of the wall of the cavity structure and the cap such that a dielectric gap is established between the conductive material and a planar antenna when the planar antenna is coupled onto the first longitudinal end of the cavity structure.

20 Claims, 5 Drawing Sheets

(56) References Cited

U.S. PATENT DOCUMENTS

2020/0194874 A1 * 6/2020 De Sousa ................ H01Q 7/00

OTHER PUBLICATIONS

Elmansouri, Mohamed A. et al., “Low-Dispersion Spiral Antennas,” IEEE Transactions on Antennas and Propagation, vol. 60, No. 12, pp. 5522-5530, Dec. 2012.

Huang, Huifen et al., “A New Spiral Antenna With Improved Axial Ratio and Shorted Arm Length,” Progress In Electromagnetics Research C, vol. 46, pp. 83-89, 2014.

Liu, Q. et al., “A Novel Compact Archimedean Spiral Antenna With Gap-Loading,” Progress In Electromagnetics Research Letters, vol. 3, pp. 169-177, 2008.

Nakano, Hisamatsu et al., “A Monofilar Spiral Antenna and its Array Above a Ground Plane—Formation of a Circularly Polarized Tilted Fan Beam,” IEEE Transactions on Antennas and Propagation, vol. 45, No. 10, pp. 1506-1511, Oct. 1997.

Nakano, Hisamatsu et al., “A Monofilar Spiral Antenna Excited Through A Helical Wire,” IEEE Transactions on Antennas and Propagation, vol. 51, No. 3, pp. 661-664, Mar. 2003.

WikipediA, “Spiral Antenna,” https://en.wikipedia.org/wiki/Spiral_antenna, 3 pages, Aug. 7, 2020.

* cited by examiner

PARTIALLY METALIZED ANTENNA CAVITY FOR PLANAR ANTENNAS

RELATED APPLICATIONS

This application hereby claims the benefit of and priority to U.S. Provisional Patent Application 63/305,294, titled “PARTIALLY METALIZED ANTENNA CAVITY FOR PLANAR ANTENNAS,” filed Feb. 1, 2022, which is hereby incorporated by reference in its entirety.

TECHNICAL BACKGROUND

Various antenna structures and types have been developed to transmit and receive radio frequency (RF) energy. Among these antenna types, planar antennas have antenna elements that lie within a single plane, and thus are generally flat or planar in configuration. Often, planar antennas have a thin conductive material forming the antenna elements applied onto a structural substrate. For example, planar antennas might have antenna elements printed onto a circuit board or other dielectric material. Among the family of planar antennas, various configurations include spiral antennas, log periodic antennas, sinuous antennas, and patch antennas, among other configurations. Spiral antennas have antenna elements shaped into spirals, which might comprise spiral shapes selected from among Archimedean spirals, logarithmic spirals, square spirals, and star spirals.

Cavities can be employed for planar antennas to direct RF energy in a preferred direction, as most planar antennas are inherently bi-directional. These cavities typically comprise metallic or conductive cylinders into which a planar antenna is positioned. A cap or back is installed for the cavity which absorbs or reflects RF energy in a particular direction and provides for unidirectional operation of the planar antenna.

OVERVIEW

Provided herein are various enhancements for radio frequency (RF) antennas and antenna assemblies. The enhanced examples provide for use of a planar antenna in combination with a cavity while reducing or eliminating unwanted narrowband resonances. A partially-metallized cavity is employed which has a shared structure forming both the cavity and a dielectric portion that supports the planar antenna. This partially-metallized cavity allows for improved RF performance without increasing diameter of the cavity and improved stability of a solid, non-metalized cylinder side walls. Example manufacturing techniques which form this cavity can be 3D printing or other additive manufacturing techniques. Walls of the cavity can then be partially metallized to form various patterns of conductive material and insulating material, onto which the antenna element(s) are coupled.

In one example, an antenna assembly includes a cavity structure comprising an interior volume surrounded by a wall and having an opening at a first longitudinal end and a cap at a second longitudinal end. A conductive material disposed on a portion of the wall of the cavity structure and the cap such that a dielectric gap is established between the conductive material and a planar antenna when the planar antenna is coupled onto the first longitudinal end of the cavity structure.

In another example, a method of manufacturing includes forming a cavity structure comprising an interior volume surrounded by a wall and having an end cap on a first longitudinal end. The method also includes metallizing a portion of the wall of the cavity structure and the end cap with a conductive material such that a dielectric gap is established on the wall between the conductive material and a planar antenna positioned on a second longitudinal end.

In yet another example, an antenna apparatus includes a cavity structure comprising an interior volume surrounded by a wall and having an end cap on a first longitudinal end. Metallization is established over a portion of the wall of the cavity structure and the end cap such that a dielectric gap is established on the wall between the conductive material and a planar antenna positioned on a second longitudinal end.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Planar antennas have antenna elements that are arranged within a single plane, and thus are generally flat or ‘planar’ in configuration. Some forms of planar antennas have a thin patterned conductive layer forming the antenna elements applied onto a structural substrate (e.g. circuit board material, dielectric material). Example planar antennas include planar versions of spiral antennas, log periodic antennas, sinuous antennas, and patch antennas, among other configurations. The examples shown herein show planar spiral and planar log-periodic antennas, but it should be understood that similar structures and techniques can be applied to other types of planar antennas.

As one example of planar antennas, spiral antennas can be employed. Spiral antennas are largely frequency independent, with circularly polarized radiation patterns over multi-octave bandwidths. A high frequency limit of a spiral antenna is based on fine details in the center of the antenna structure and a low frequency limit (i.e. “turn on” frequency) is based primarily on the circumference of the antenna. Typically, spiral antennas are bi-directional in radiation pattern, meaning that RF energy is emitted (or can be received) in both directions along an axial direction or longitudinal axis.

To make spiral antennas and other planar antennas have a unidirectional or single-axis behavior, a cavity can be employed. These cavities typically comprise metallic or conductive cylinders into which a planar antenna is positioned. An end cap or back is installed on the cavity, with the antenna installed on the other end or within the cavity. The cap can be configured to absorb or reflect RF energy in a particular direction and provide for unidirectional operation of the planar antenna. The addition of a circumferential capacitively coupled ring to a planar antenna, such as outside of the spiral geometry of a spiral antenna, can improve low frequency performance, allowing for smaller spirals. This technique can be referred to as gap loading using a circular frame. However, when the cavity inner diameter is close to the diameter of the spiral and capacitive ring diameter, there are narrowband interactions between the planar antenna, rings, and the metallic cavity that severely degrade the antenna performance.

Figure 5:
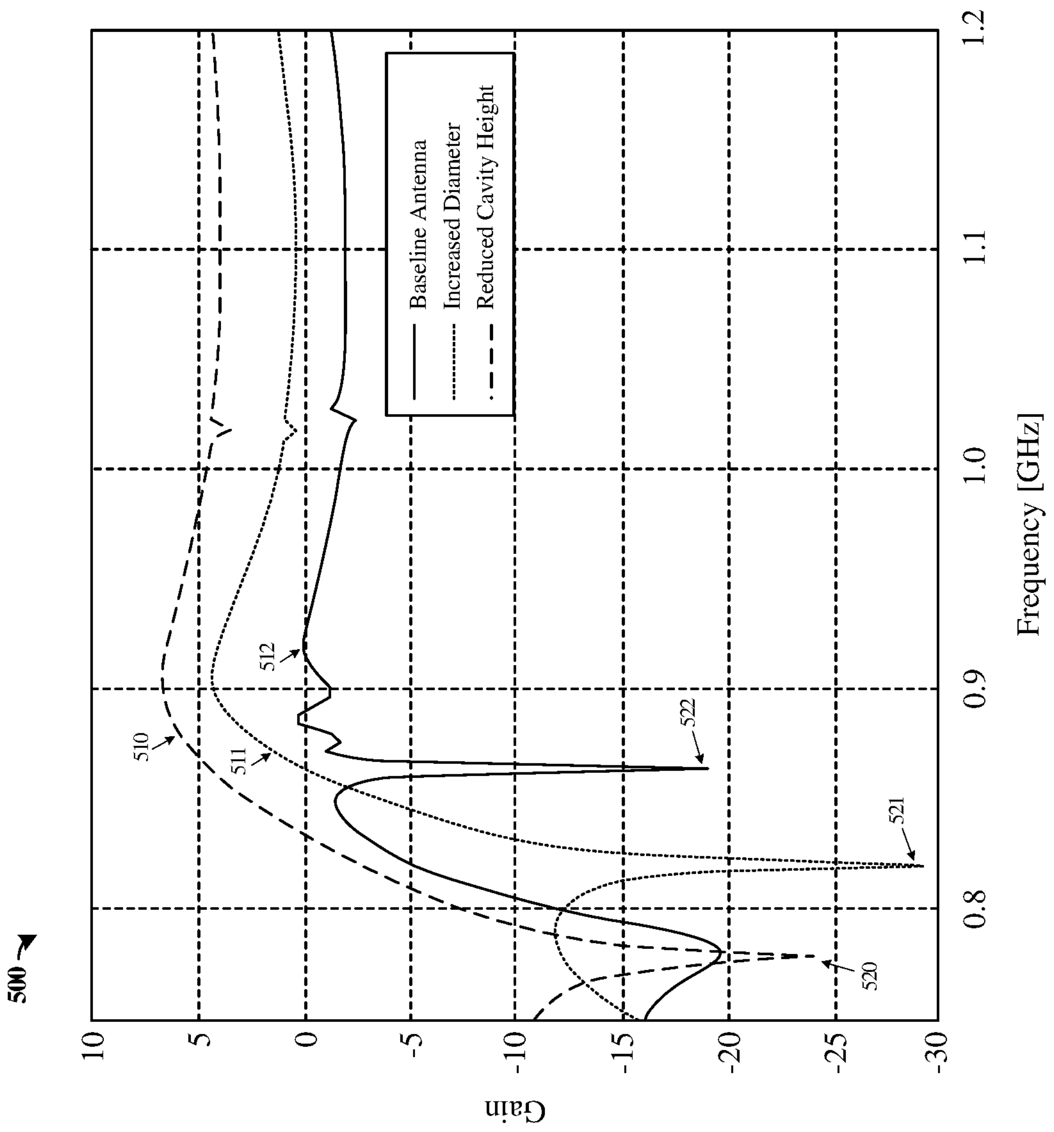
FIG. 5 illustrates performance characteristics in an implementation.

FIG. 5 shows example graph 500 of these unwanted narrowband resonances. A vertical axis relates to the gain (in decibels, dB), while a horizontal axis relates to frequency (in gigahertz, GHz). Unwanted narrowband resonances (520, 521, 522) are experienced for frequency response curves in various configurations among baseline conditions 510, increased antenna diameter conditions 511, and reduced cavity height conditions 512. To avoid unwanted narrowband resonances, the cavity diameter can either increased or the cavity walls removed. Increasing the cavity diameter is not usually desirable, as it increases size and weight and defeats the purpose of including the capacitively loaded ring into the spiral element.

When employed, the cavity itself can be formed from a conductive material, such as a cylindrical 'can' shape machined or rolled out of aluminum or other conductive material. As noted, an increased cavity size/diameter can reduce interaction with the antenna and ring, but this increases a footprint of the overall antenna assembly which is undesirable in many applications. Alternatively, no cavity can be employed, but then bidirectional radiation is experienced with potential for interference and reflections on the antenna itself and nearby equipment. In some examples, a top portion of the cylindrical cavity (opposite of the conductive cap) can be removed, and the antenna supported by a foam material to elevate the antenna above the extent of the cavity walls. However, this foam material is typically undesirable from a structural stability standpoint and can attenuate RF signals in some examples. Thus, while increasing the size of the cavity or replacing a top length of the cavity with a foam can reduce unwanted narrowband resonance effects, these techniques increase the size/weight or decrease mechanical stability of the antenna system. Instead of spiral antenna types, shorted ring log-periodic antennas can reduce but not completely eliminate this unwanted narrowband resonance.

The enhanced examples herein provide for use of a planar antenna with a ring structure in combination with a cavity while reducing or eliminating the unwanted narrowband resonances noted above. A partially-metallized cavity is employed which has a shared structure forming both the cavity and a dielectric portion that supports the planar antenna. This partially-metallized cavity allows for improved RF performance without increasing diameter of the cavity and improved stability of a solid, non-metalized cylinder side walls. One example manufacturing technique which forms this cavity can be 3D printing, also referred to as a type of additive manufacturing. Walls of the cavity can then be partially metallized to form various patterns of conductive material and insulating material, onto which the antenna element(s) are coupled. While 3D printing can be employed, other techniques can instead be used to form the cavity with associated post-processing with conductive materials, such as injection molding manufacturing techniques, casting, and machining manufacturing techniques (e.g., subtractive manufacturing).

In these various manufacturing techniques, a dielectric or RF-transparent material, such as various types of plastic, polytetrafluoroethylene (PTFE), polyimide, nylon, polypropylene, ABS, PVC, Rexolite, various ceramics, or other dielectric/low-conductivity material is formed into a cylindrical shape having a closed end or cap on a first end. An antenna structure can be formed on the second end opposite to that of the cap of the first end. The selected material is selected to be RF transparent or nearly RF transparent, so proximity close to the antenna elements and capacitive ring will not typically introduce negative resonances. A metallic or conductive material is deposited onto the outer walls of the cavity and onto the first end/cap. The conductive material can be directly deposited into a desired conductive pattern, or deposited over the entire outer walls of the cavity and then etched or otherwise removed to form the desired conductive pattern. Other techniques include masked additions, selectively applied surface treatments, selectively applied coatings, or other applications of conductive material into the desired conductive pattern. Example techniques include vapor deposition, acid etching, laser ablation, or other various techniques to add or remove conductive material in the desired patterns. Thus, a generally cylindrical cavity is formed from dielectric or insulating material having a metalized outer surface with a particular pattern.

Even when no patterns are employed, the metallized outer surface of the cavity will slightly increase the effective electrical diameter of the cavity and result in a reduction in the unwanted narrowband resonances by reducing the coupling between the cavity walls, antenna elements, and ring. However, when patterns of metallization are employed, the cavity side walls might only be metallized up to a certain height of the walls. This provides for partial cavities while maintaining mechanical support of the antenna elements attached thereto, and further increases the distance of the planar antenna and metalized cavity wall, reducing or eliminating narrowband resonances. The use of metallization applied onto 3D printed parts allows for conductive antenna elements to be placed on a variety of 3D printed dielectric structures, and allows for metalizing only portions of the parts to achieve improved RF performance while maintaining mechanical performance. This 3D printed material can then give support to the antenna elements, even if the cavity side walls are only metalized up to a certain portion of the total cavity height. This can lead to further size reductions in planar antennas, lower mass, reduction or elimination of the narrowband resonances, improved low frequency RF performance, provides for faster, less expensive manufacturing, and provides for additional complex cavity geometries such as serrated edges, spiral helix shapes, dots, additional rings, and more. Also, while the outside or outer layer of the cavity is discussed as having metallization applied, it should be understood that other examples might include metallization and pattens on an interior of the cavity walls or within an interior of the material.

Figure 1:
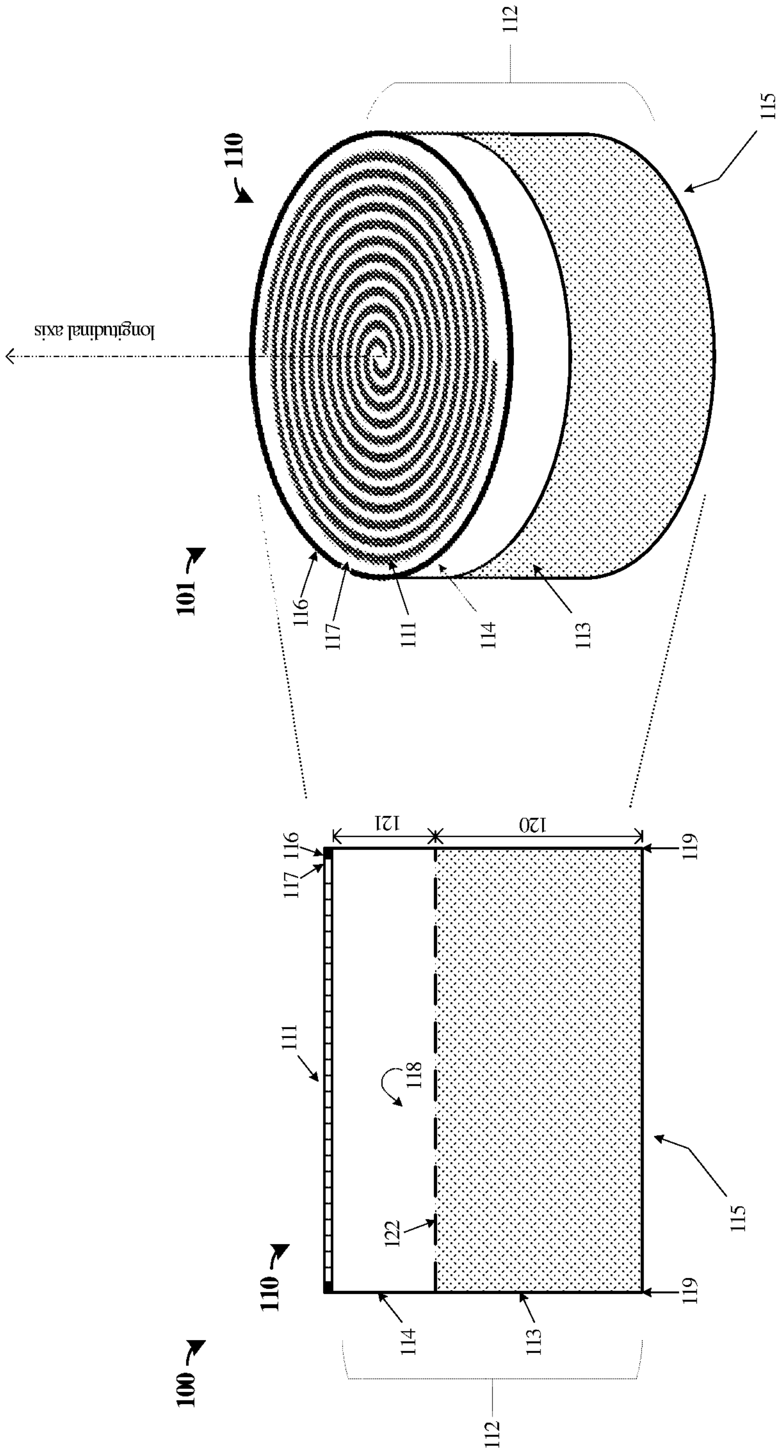
FIG. 1 illustrates an antenna assembly in an implementation.

Turning now to example implementations of the partially-metallized cavity structures for planar antennas, FIG. 1 is presented. FIG. 1 includes cross-sectional side view 100 and isometric view 101 of antenna assembly 110. Antenna assembly 110 includes antenna elements 111, cavity structure 112, and optional ring structure 116. Antenna elements 111 comprise a two-arm spiral antenna in this example. Other antenna element types are discussed in the Figures below.

Cavity structure 112 comprises interior cavity or volume 118 surrounded by wall 119 and having an opening at a first longitudinal end and a cap included at a second longitudinal end. Cavity structure 112 includes metallized portion 113, non-metallized portion 114, and bottom end cap 115 (hidden from view). Metallized portion 113 comprises a conductive material disposed, deposited, formed, or otherwise included onto a portion of the wall of cavity structure 112 and bottom end cap 115. This conductive material is included such that a dielectric gap (non-metallized portion 114) is established between metallized portion 113 and antenna elements 111 when antenna elements 111 are coupled onto the first longitudinal end of cavity structure 112. Metallized portion 113 can form a conductive band about the walls of cavity structure 112 (along with bottom end cap 115), or form other conductive features.

Ring structure 116 is shown circumferentially outside of a perimeter of antenna elements 111, and separated by gap 117 from antenna elements 111. Gap 117 and the thickness of ring structure 116 can vary based on application and frequency characteristics desired for antenna assembly 110. Ring structure 116 and gap 117 might be omitted in some examples.

In operation, conductive connections are made to/from transmit/receive circuitry to each arm of antenna structure 111, such as to the central nodes of each arm. Antenna structure 111 can transmit or receive RF energy which is carried by the corresponding conductive connections. Additionally, at least a portion of metallized portion 113 as well as bottom end cap 115 are coupled to a reference potential or RF ground potential. As will be discussed below, a portion of metallized portion 113 can be left "floating" or unconnected to ground. Directionality along the longitudinal axis of antenna assembly 110 is provided by the use of cavity structure 112 and bottom end cap 115. Instead of, or in addition to, conductive bottom end cap 115, an RF attenuator or RF absorber material can be employed inside the cavity at conductive bottom end cap 115.

Antenna elements 111 comprise conductive features in the pattern or configuration of a desired antenna type. Although a two-arm spiral configuration with an outer ring structure 116 is shown in FIG. 1, other antenna types can be employed such as log periodic antennas, sinuous antennas, and patch antennas. One example construction of antenna elements 111 and ring structure 116 comprises printed circuit features laid onto a circuit board material, and these printed circuit features can comprise any suitable conductive material including copper, aluminum, various metals or metallic alloys, or conductive carbon allotropes if associated conductive properties are sufficient. The circuit board material can comprise a dielectric material such as FR4, RT Duroid, Rogers RO, PTFE, polyimide, and the like. Various solder masking or etch masking can be employed to form the antenna elements by etching a conductive layer away from the underlying substrate. Other manufacturing techniques can be employed to form antenna elements 111 and ring structure 116, such as stamped metal, machining, laser ablation, and other suitable techniques.

Cavity structure 112 comprises cylindrical walls and a bottom end cap comprising a plastic, polymer, or composite material having RF-transparent or dielectric properties. The specific material can be selected based on the RF emissivity properties, structural properties, and 3D printing compatibility. Such materials are discussed herein. Other shapes or cavity structures than a cylindrical cavity can be employed, such as hollow shapes formed from rectangular, square, triangular, hexagonal, octagonal, or other shapes for one or more of the walls. For example, a hexagonal end cap might be employed with rectangular vertical walls.

Metallized portion 113 is deposited or etched to cover only a portion of the vertical walls of cavity structure 112, as shown by height 120. Metallized portion 113 can comprise any suitable conductive material including copper, aluminum, various metals or metallic alloys, or conductive carbon allotropes if conductive properties are sufficient. Cavity structure 112 might be formed concurrent with metallized portion 113 using a 3D printing technique if selective sections of conductive and non-conductive material can be printed concurrently. As discussed, various techniques can be employed to add or remove conductive material from the walls/cap of cavity structure 112 to suit the application or desired pattern. Likewise, non-metallized portion 114 has a height 121 and can be formed having various patterns at interface 122 between non-metallized portion 114 and metallized portion 113. Also, various patterns can be realized within metallized portion 113.

To form the entire assembly comprising antenna assembly 110, a substrate supporting antenna elements 111 and ring structure 116 can be formed in a single workpiece with cavity structure 112 in some examples, or the substrate can be a separate workpiece. When formed from a single workpiece, a 3D printing technique can form the hollow void between the endcaps of cavity structure 112. As with metallized portion 113, the conductive portions of antenna elements 111 and ring structure 116 can be formed using various deposition, etching, or ablation techniques. When a separate workpiece is employed, such as when antenna elements 111 and ring structure 116 are formed on a printed circuit board, then antenna elements 111 and ring structure 116 can be attached, along with the corresponding substrate, onto cavity structure 112 using various fasteners, adhesives, clips, and the like.

Figure 2:
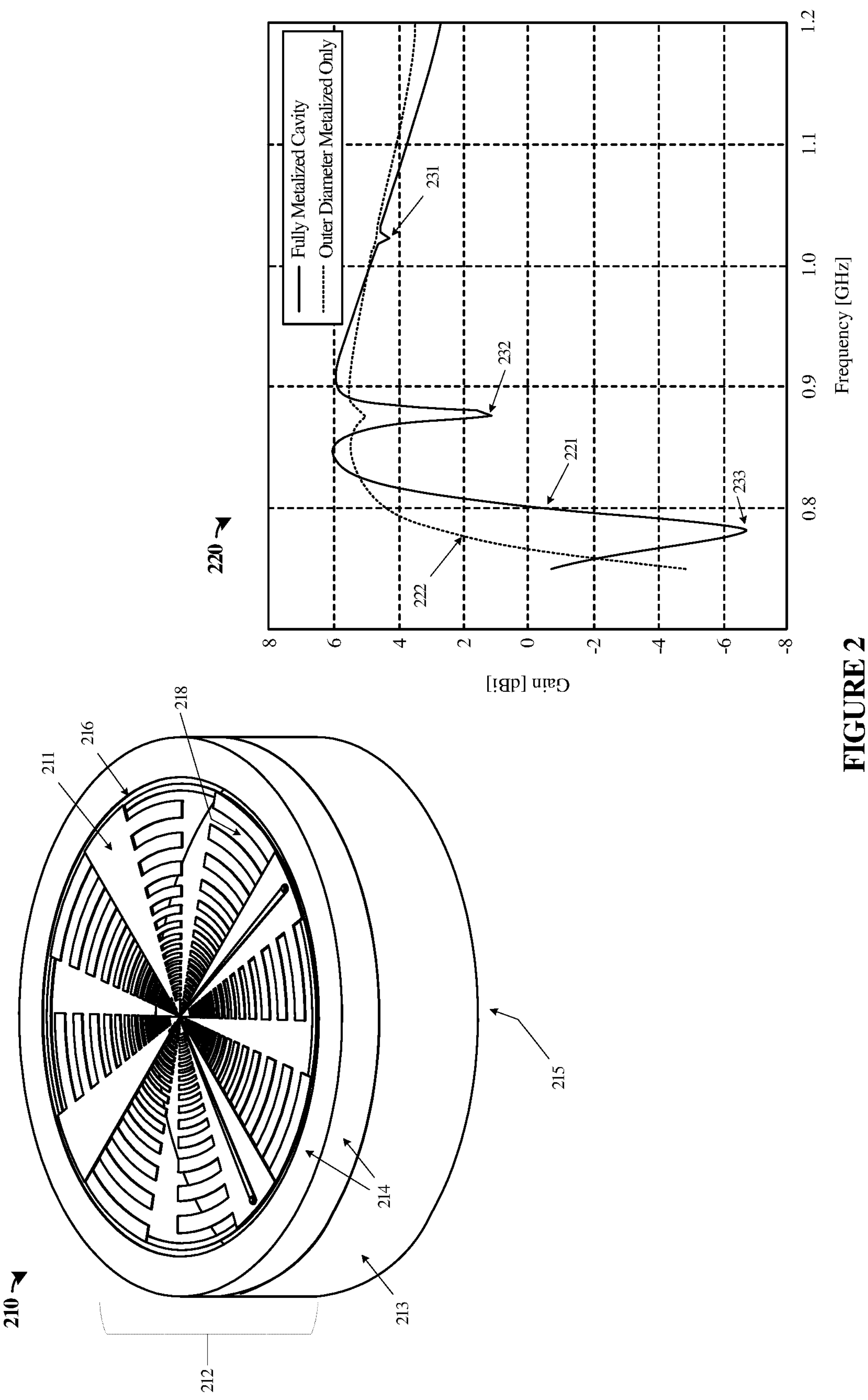
FIG. 2 illustrates an antenna assembly and performance characteristics in an implementation.

FIG. 2 shows a further example antenna assembly 210 which employs manufacturing techniques and structures discussed herein. Antenna assembly 210 comprises a planar log periodic type antenna assembly comprising antenna elements 211 and cavity structure 212. The view of antenna assembly 210 in FIG. 2 shows a transparent view through antenna elements 211 into the central cavity/void (218) of cavity structure 212. Planar log periodic type antenna elements 211 have a corresponding outer ring structure 216 which may include a perimeter gap. Cavity structure 212 comprises non-metallized portions 214 and metallized portions 213. Cavity structure 212 includes end cap 215 and hollow cavity 218. Similar manufacturing and assembly techniques as discussed above can be employed for the elements of FIG. 2.

Graph 220 shows modeled performance curves 221 and 222 for antenna assembly 210. A vertical axis relates to the gain (dB), while a horizontal axis relates to frequency (GHz). As can be seen for curve 221, gain performance characteristics for an antenna assembly with a fully metallized cavity has several unwanted narrowband resonances (231, 232, 233). However, using the enhanced techniques and structures discussed herein, curve 222 shows gain performance characteristics for an antenna assembly with a partially-metallized cavity. Curve 222 has significantly reduced narrowband resonances, which may be undetectable for some resonances.

Figure 3:
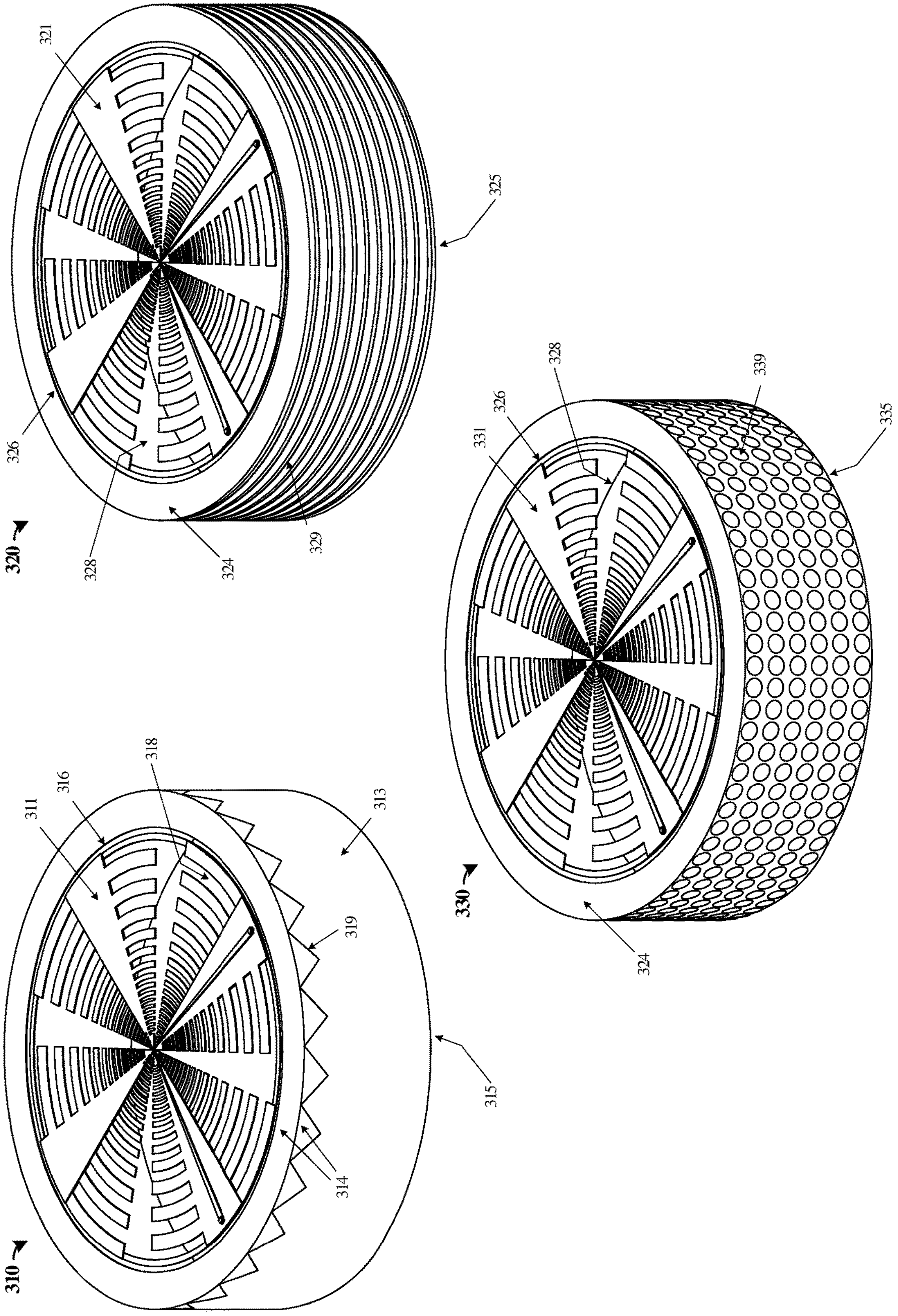
FIG. 3 illustrates antenna assemblies in an implementation.

FIG. 3 shows further example antenna assemblies which employ manufacturing techniques and structures discussed herein. FIG. 3 includes antenna assemblies 310, 320, and 330. The structures in FIG. 3 comprises non-metallized portions and metallized portions. The metallized material is formed on an exterior of the cavity walls in these examples, although variations are possible. It should be understood that other partially-metallized shapes, interfaces, and patterns can be employed than shown herein.

Antenna assembly 310 illustrates a serrated or repeating triangular edge interface 319 between non-metallized portions 314 and metallized portions 313 of the cavity walls that structurally support planar antenna 311. Although the term serrated is employed herein, these edge interface features can also have other shapes or configurations, such as saw-tooth, scalloped, sinusoid, irregular, repeating, log periodic, or other configurations. The conductive portions forming serrated edge interface 319 can be optionally coupled to a reference potential or RF ground for a circuit that feeds planar antenna 311. Antenna assembly 310 can have a corresponding outer ring structure 316 which may include a perimeter gap. Antenna assembly 310 includes end cap 315 and hollow cavity 318.

Antenna assembly 320 illustrates helical conductive pattern 329 formed between non-metallized portions 324 and metallized portions (329) of the cavity walls that structurally support planar antenna 321. Helical conductive pattern 329 can comprise one or more separate helical antennas interspersed with non-metallized portions and are helically-distributed over a side of antenna assembly 330. Helical conductive pattern 329 can form helical antenna elements which can operate separately or in conjunction with planar antenna 321. The conductive portions forming helical conductive pattern 329 can be optionally coupled to a reference potential or RF ground for a circuit that feeds planar antenna 321, may be coupled to the same circuit that feeds planar antenna 321, or may have a separate set of circuitry for independent operation from planar antenna 321. Antenna assembly 320 can have a corresponding outer ring structure 326 which may include a perimeter gap. Antenna assembly 320 includes end cap 325 and hollow cavity 328.

Antenna assembly 330 illustrates dotted conductive pattern 339 formed between interspersed non-metallized portions 324 and metallized portions (339) of the cavity walls that structurally support planar antenna 331. Dotted conductive pattern 339 conductive elements are interspersed with non-metallized portions and distributed over side walls of antenna assembly 330. Dotted conductive pattern 339 can comprise one or more separate dots, which can comprise circular shapes as shown, or any other suitable shape including irregular or metamaterial style of shapes. The conductive portions forming dotted conductive pattern 339 (or a subset thereof) can be optionally coupled to a reference potential or RF ground for a circuit that feeds planar antenna 331 or may be left floating or unconnected to any reference potential. When left floating, the disconnected dotted conductive pattern 339 can prevent RF currents from being established on the exterior of the cavity walls while still providing unidirectional performance for planar antenna 331. Antenna assembly 330 can have a corresponding outer ring structure 336 which may include a perimeter gap. Antenna assembly 330 includes end cap 335 and hollow cavity 338.

Figure 4:
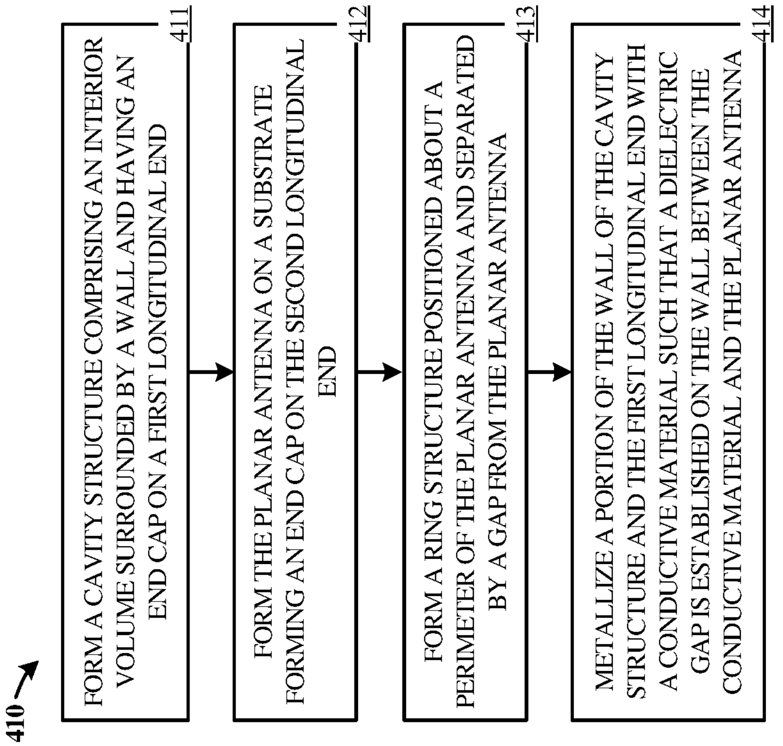
FIG. 4 illustrates example operations to manufacture an antenna assembly in an implementation.

FIG. 4 illustrates example operations 410 to manufacture an antenna assembly in an implementation. The operations of FIG. 4 are discussed in relation to elements of FIG. 1, although some reference is made to elements of the other Figures herein. Steps/operations can be performed in a different order than noted below. For example, metallization operations can be used to form wall features as well as antenna features after establishing the main cavity and end caps. Also, a 'top' end cap housing the antenna elements can be formed separately and later attached, or formed concurrently from the same workpiece of material as cavity walls and a 'bottom' end cap.

In operation 411, cavity structure 112 is formed comprising interior volume 118 surrounded by wall 119 and having end cap 115 on a first longitudinal end (e.g., bottom). Example manufacturing techniques which can be used to form this cavity include additive manufacturing, such as 3D printing. Other techniques can instead be used to form the cavity, such as injection molding manufacturing techniques, casting, and machining manufacturing techniques (e.g., subtractive manufacturing).

Operation 412 includes forming antenna elements 111 as a planar antenna on a substrate forming an end cap on a second longitudinal end (e.g., top). This top end cap comprises metallic or conductive features forming the antenna elements and can also include a substrate material that structurally holds or supports the antenna elements. In some examples, the substrate forms the entire top end cap with antenna elements formed onto the substrate. In other examples, the substrate only corresponds to locations below the antenna elements, and gaps or etched-out voids are included between arms of the antenna elements into interior volume 118. While FIG. 1 shows a planar spiral antenna, other antenna types can be included, such as the planar log periodic type antenna of FIG. 2. The vertical stackup thickness of the antenna elements can vary based on application and power handling requirements, but typically on the scale of approximately 1 millimeter (mm) or less. In addition to antenna elements, a circumferential ring or perimeter ring can be formed outside of the perimeter of the antenna elements and within the same plane. Operation 413 includes forming ring structure 116 positioned about a perimeter of the planar antenna and separated by gap 117 from the planar antenna. The gap includes a dielectric gap different than gap 114. Ring structure 116 can be formed in a similar manner as antenna elements 111.

Once cavity structure 112 is formed, then operation 414 includes partial metallizing of cavity structure 112. The partially-metallized cavity (112) is employed which has a shared structure forming both the cavity and a dielectric portion that supports the planar antenna. This partially-metallized cavity allows for improved RF performance without increasing diameter of the cavity and improved stability of a solid, non-metalized cylinder side walls. Walls of the cavity can be partially metallized to form various patterns of conductive material and insulating material, onto which the antenna element(s) are coupled.

A portion 113 of wall 119 of the cavity structure and the first longitudinal end (cap 115) can be metallized with a conductive material such that dielectric gap 114 is established on wall 119 between the conductive material and the planar antenna. Although walls 119 and antenna elements 111 typically lie in perpendicular axes/planes, dielectric gap 114 is established on walls 119. The metallizing can be performed after formation of walls 119 with end cap 115. In other examples, the metallizing can be performed after formation of walls 119 with end cap 115 as well as the end cap on the top side of the structure (e.g., the second longitudinal end that houses antenna elements 111). The planar antenna can be formed on the second longitudinal end using by at least partially metallizing an end cap of the second longitudinal end with the conductive material, either concurrent with or separately from, the partial metallization according to a pattern on walls 119 and full metallization on cap 115. In FIG. 1, conductive material comprising the metallization is disposed on portion 113 of wall 119 of cavity structure 112 to form a conductive band about wall 119 of cavity structure 112. The conductive band has edge or interface 122 with dielectric gap 114 comprising a straight edge, serrated edge, scalloped edge, dotted edge, or helical edge, including combinations thereof. In some examples, the conductive band comprises at least one among a filled band, helical banding, and dotted band.

Once cavity 122 and the partial metallization is performed, including any antenna elements and ring structures, then various interconnect can be established. RF connections can be coupled to portions of antenna elements 111, ring structure 116, or metallized portion 113. These RF connections can couple the aforementioned elements to RF circuitry including RF transmitters, RF receivers, amplifiers, filters, polarizers, multiplexers, beamforming elements, or other various circuitry. Some RF connections include RF ground potential connections. Some metallization features can be left to 'float' or be unconnected to various RF circuitry or RF ground potentials.

Frequency ranges for RF components, configurations, systems, and arrangements herein include various RF bands, such as microwave frequencies capable of transiting RF waveguide structures. Different frequency bands can be supported by similar architectures as shown herein, with associated geometry scaling to suit the selected frequency ranges. While the examples herein cover portions of the RF bands noted above, other examples might include the Ka band or Ku band or other portions of the K bands (approximately 12 to 40 GHz), or X band (approximately 8 to 12 GHZ). Other examples might be configured to support a frequency range corresponding to the IEEE bands of S band, L band, C band, X band, Ku band, K band, Ka band, V band, W band, among others, including combinations thereof. Other example RF frequency ranges and service types include ultra-high frequency (UHF), super high frequency (SHF), extremely high frequency (EHF), or other parameters defined by different organizations. In addition, various frequency bands associated with communication technology, such as Wi-Fi and 4G/5G cellular communications can be employed. These include the IEEE 802.11 family of frequency bands (Wi-Fi), and the 4G/5G broadband cellular network frequency bands including the low band (600 to 700 MHz), mid band (1.7 GHz to 2.5 GHZ), high band (24 to 100 GHz (mmWave)) defined by the 3rd Generation Partnership Project (3GPP) and other organizations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An antenna assembly, comprising:

a cavity structure having a longitudinal axis and comprising an interior volume surrounded by a cavity side wall, a planar antenna assembly forming a first longitudinal end, and a cap forming a second longitudinal end;

the cavity side wall comprising a partially metallized configuration such that a conductive material is disposed as a band on only a portion of a dielectric material forming the cavity side wall to establish a dielectric gap about the longitudinal axis between the conductive material disposed on the cavity side wall and the planar antenna assembly; and the planar antenna assembly comprising a capacitively coupled conductive ring positioned in a same plane and about a perimeter of a planar antenna, separated by a perimeter dielectric gap from the planar antenna, and providing a further dielectric gap that extends from the conductive ring over the first longitudinal end to the dielectric gap of the cavity side wall.

2. The antenna assembly of claim 1, wherein the partially metallized configuration is configured to establish an effective electrical diameter of the cavity structure larger than a diameter of the first longitudinal end and reduce narrowband resonances over a bandwidth of the planar antenna.

3. The antenna assembly of claim 1, wherein a substrate housing the planar antenna assembly, the cap, and the cavity side wall are formed from a single workpiece of material.

4. The antenna assembly of claim 1, wherein the planar antenna assembly and the cavity side wall comprising the cap are formed from separate workpieces of material; and wherein the planar antenna assembly is mounted to the cavity side wall to form the first longitudinal end of the housing.

5. The antenna assembly of claim 1, wherein the cavity side wall and cap are formed using at least one among an injection molding manufacturing technique, subtractive machining manufacturing technique, additive manufacturing technique, and 3D printing manufacturing technique.

6. The antenna assembly of claim 1, wherein the conductive material is selectively deposited onto the portion of the cavity side wall to form the dielectric gap.

7. The antenna assembly of claim 1, wherein the conductive material is applied to the cavity side wall and etched from a corresponding portion of the wall that forms the dielectric gap.

8. The antenna assembly of claim 1, wherein the conductive material disposed on the portion of the cavity side wall forms a serrated edge proximate to the dielectric gap.

9. The antenna assembly of claim 1, wherein the conductive material disposed on the portion of the cavity side wall of the cavity structure forms a pattern of dots about the cavity side wall.

10. The antenna assembly of claim 1, wherein the conductive material disposed on the portion of the cavity side wall forms a helical structure about the longitudinal axis on the cavity side wall.

11. The antenna assembly of claim 1, wherein the cavity structure forms a generally cylindrical structure; and wherein the conductive material and the cap are electrically grounded.

12. The antenna assembly of claim 1, wherein the planar antenna comprises a planar log periodic antenna.

13. A method, comprising:

forming a cavity structure having a longitudinal axis and comprising an interior volume surrounded by a cavity side wall and having an end cap on a first longitudinal end;

metallizing a band of the cavity side wall and the end cap with a conductive material such that a dielectric gap is established about the longitudinal axis on the cavity side wall between the conductive material and a planar antenna assembly positioned on a second longitudinal end; and forming the planar antenna assembly comprising a capacitively coupled conductive ring positioned in a same plane and about a perimeter of a planar antenna, separated by a perimeter dielectric gap from the planar antenna, and providing a further dielectric gap that extends from the conductive ring over the second longitudinal end to the dielectric gap of the cavity side wall.

14. The method of claim 13, comprising:

forming the planar antenna assembly as a printed circuit forming the second longitudinal end.

15. The method of claim 14, comprising:

wherein the substrate forming the second longitudinal end, the end cap on the first longitudinal end, and the cavity side wall are formed from a single workpiece.

16. The method of claim 15, wherein the single workpiece is formed using an additive manufacturing process; and wherein the metallizing is performed after formation of the second longitudinal end, the end cap on the first longitudinal end, and the cavity side wall.

17. The method of claim 13, wherein the conductive material comprising metallization of the band is configured to establish an effective electrical diameter of the cavity structure larger than a diameter of the second longitudinal end and reduce narrowband resonances over a bandwidth of the planar antenna.

18. An antenna apparatus, comprising:

a cavity structure having a longitudinal axis and comprising an interior volume surrounded by a cavity side wall and having an end cap on a first longitudinal end;

metallization over a band of the cavity side wall about the longitudinal axis and the end cap such that a dielectric gap is established on the cavity side wall between the conductive material and a planar antenna assembly positioned on a second longitudinal end; and the planar antenna assembly comprising a capacitively coupled conductive ring positioned in a same plane and about a perimeter of a planar antenna, separated by a perimeter dielectric gap from the planar antenna, and providing a further dielectric gap that extends from the conductive ring over the second longitudinal end to the dielectric gap of the cavity side wall.

19. The antenna apparatus of claim 18, wherein the cavity structure forms a generally cylindrical structure; and wherein conductive material comprising the metallization is disposed on the band of the cavity side wall to form a conductive band about the cavity side wall;

wherein the conductive band and the end cap are electrically grounded.

20. The antenna apparatus of claim 18, wherein conductive material comprising the metallization about the cavity side wall is configured to establish an effective electrical diameter of the cavity structure larger than a diameter of the second longitudinal end and reduce narrowband resonances over a bandwidth of the planar antenna.

* * * * *